US010384494B2

(12) United States Patent
Naruse (10) Patent No.: US 10,384,494 B2
(45) Date of Patent: Aug. 20, 2019

(54) TIRE NOISE REDUCTION DEVICE AND PNEUMATIC TIRE

(71) Applicant: The Yokohama Rubber Co., LTD., Minato-ku, Tokyo (JP)

(72) Inventor: Masahiro Naruse, Oiwake (JP)

(73) Assignee: The Yokohama Rubber Co., LTD. (JP)

( * ) Notice: Subject to any disclaimer, the term of this patent is extended or adjusted under 35 U.S.C. 154(b) by 312 days.

(21) Appl. No.: 15/321,707

(22) PCT Filed: Jun. 19, 2015

(86) PCT No.: PCT/JP2015/067770
§ 371 (c)(1),
(2) Date: Dec. 22, 2016

(87) PCT Pub. No.: WO2015/198996
PCT Pub. Date: Dec. 30, 2015

(65) Prior Publication Data
US 2017/0151838 A1    Jun. 1, 2017

(30) Foreign Application Priority Data

Jun. 24, 2014 (JP) .................................. 2014-129553

(51) Int. Cl.
*B60C 19/00*    (2006.01)
*B60C 5/00*    (2006.01)

(52) U.S. Cl.
CPC .................................. *B60C 19/002* (2013.01)

(58) Field of Classification Search
CPC .......... B60C 19/002; B60C 19/00; B60C 5/00
See application file for complete search history.

(56) References Cited

U.S. PATENT DOCUMENTS

| 7,735,532 B2 * | 6/2010 | Tanno | B60C 19/002 |
| | | | 152/157 |
| 8,342,289 B2 * | 1/2013 | Tanno | B60C 19/002 |
| | | | 152/157 |

(Continued)

FOREIGN PATENT DOCUMENTS

| JP | 2006-306285 | 11/2006 |
| JP | 2010-000950 | 1/2010 |

(Continued)

OTHER PUBLICATIONS

International Search Report for International Application No. PCT/JP2015/067770 dated Jul. 21, 2015, 4 pages, Japan.

*Primary Examiner* — Edgardo San Martin
(74) *Attorney, Agent, or Firm* — Thorpe North & Western (57) ABSTRACT

A tire noise reduction device includes a noise absorbing member formed of a porous material, a band member formed of a thermoplastic resin, the band member being formed in an annular shape in a tire circumferential direction for mounting the noise absorbing member on a tire inner surface; a bonding member bent into a concave cross-sectional shape, a band bonding section at a key point where the noise absorbing member, the band member, and the bonding member are bonded by interposing the noise absorbing member between the bonding member and the band member. A band width (WB) (mm) of the band member and length (WY) (mm) of the band bonding section in a band width direction satisfy the following Formula (a) and a yield strength of the band section at the band bonding position in an 80° C. environment is 320 N or greater $$0.01 < WY/WB < 0.75 \qquad (a).$$

13 Claims, 8 Drawing Sheets

(56) References Cited

U.S. PATENT DOCUMENTS

| | | | | |
|---|---|---|---|---|
| 8,505,677 B2* | 8/2013 | Tanno | ................... | B60C 19/002 |
| | | | | 152/157 |
| 8,910,681 B2* | 12/2014 | Tanno | ................... | B60C 19/002 |
| | | | | 152/157 |
| 8,915,272 B2* | 12/2014 | Tanno | ................... | B60C 19/002 |
| | | | | 152/157 |
| 8,997,805 B2* | 4/2015 | Tanno | ................... | B29C 65/08 |
| | | | | 152/157 |
| 9,211,685 B2* | 12/2015 | Tanno | ................... | B29C 65/02 |
| 2006/0231185 A1 | 10/2006 | Tanno | | |
| 2009/0314402 A1* | 12/2009 | Kuramori | ............ | B60C 19/002 |
| | | | | 152/155 |
| 2009/0320980 A1 | 12/2009 | Tanno | | |
| 2013/0098522 A1 | 4/2013 | Tanno | | |
| 2013/0098533 A1 | 4/2013 | Tanno | | |
| 2013/0248070 A1* | 9/2013 | Tanno | ................... | B60C 19/002 |
| | | | | 152/450 |
| 2013/0248080 A1* | 9/2013 | Tanno | ................... | B60C 19/002 |
| | | | | 156/73.1 |
| 2018/0215208 A1* | 8/2018 | Kanenari | ........... | B29D 30/0681 |
| 2018/0215209 A1* | 8/2018 | Naruse | ...................... | B60C 5/00 |

FOREIGN PATENT DOCUMENTS

| | | | | |
|---|---|---|---|---|
| JP | 2012-240465 | 12/2012 | | |
| WO | WO 2005/012007 | 2/2005 | | |
| WO | WO 2006/118200 | 11/2006 | | |
| WO | WO2017170154 A1 * | 5/2017 | ............... | B60C 5/00 |

* cited by examiner

TIRE NOISE REDUCTION DEVICE AND PNEUMATIC TIRE

TECHNICAL FIELD

The present technology relates to a tire noise reduction device and a pneumatic tire.

BACKGROUND ART

In the field of pneumatic tires, conventionally, a tire noise reduction device is known which is provided with a noise absorbing member formed of a porous material, and a band member formed of a thermoplastic resin in an annular shape in a tire circumferential direction for mounting the noise absorbing member on the tire inner surface (see International Patent Application Publication No. WO/2005/012007 and Japanese Unexamined Patent Application Publication No. 2006-306285A).

Members which are formed so as to have elastic characteristics due to the material and the overall shape thereof are known as the band members. The band member typically has a strip shape and is formed by installing a long strip-shaped plate material formed with an overall annular shape such that the elastic restoring force thereof biases a noise absorbing member formed of a porous material so as to press in the tire inner surface direction in the tire cavity, whereby the noise absorbing member is held (claims of International Patent Application Publication No. WO/2005/012007 and paragraph 0016 of Japanese Unexamined Patent Application Publication No. 2006-306285A).

Regarding the material of the band members, band members formed of thermoplastic synthetic resins, metal, or the like are known and band members formed of thermoplastic synthetic resins have been studied as band members which are practical in terms of being excellent in the formability of the band member itself and in the bonding workability such as bonding with noise absorbing members formed of a porous material being possible using thermal bonding (see Japanese Unexamined Patent Application Publication Nos. 2006-306285A and 2010-000950A).

However, in contrast with conventional tire sizes in which noise reduction devices are used, in a case where a tire noise reduction device using a band member formed of thermoplastic synthetic resin is applied to a tire (for example, with an outer diameter of 630 mm or greater) designed to be able to travel at extremely high speeds (for example, 270 km/h or greater, and 300 km/h or greater), the band member may be subjected to plastic deformation (usually, stretching deformation) due to the band member being under a large amount of tension due to the mass of the noise absorbing member and the thermoplastic synthetic resin forming the band member softening due to heat build-up in the tire. In a case where the band member undergoes such plastic deformation, without being able to hold the noise absorbing member normally based on the elastic characteristics, there are concerns that it will not be possible to sufficiently exhibit the functions of the noise reduction device and that the durability will be adversely affected and lead to the failure of the noise reduction device.

SUMMARY

The present technology provides a tire noise reduction device which is able to prevent plastic deformation of the band member caused by large amounts of tension and heat from the tire even when traveling with a tire for high-speed travel at high speeds such as 270 km/h or greater and 300 km/h or greater, and sufficiently exhibit a noise reduction function such a high-speed traveling, and a pneumatic tire provided with the noise reduction device.

A stud pin of the present technology includes a noise absorbing member formed of a porous material; a band member formed of a thermoplastic resin, the band member being formed in an annular shape in a tire circumferential direction for mounting the noise absorbing member on a tire inner surface; a bonding member bent into a concave cross-sectional shape; and a band bonding section at a key point where the noise absorbing member, the band member, and the bonding member are bonded by interposing the noise absorbing member between the bonding member and the band member. A band width WB (mm) of the band member and a length WY (mm) of the band bonding section in a band width direction satisfy the following formula (a) and a yield strength of the band section at the band bonding position in an 80° C. environment is 320 N or greater.

$$0.01 < WY/WB < 0.75 \tag{a}$$

In the present technology, having the configuration described above makes it possible to provide a tire noise reduction device which can prevent plastic deformation of the band member caused by large amounts of tension and heat from the tire, has good durability, and can sufficiently exhibit a noise reduction function, even when traveling with a tire for high-speed travel at high speeds such as 270 km/h or greater and 300 km/h or greater.

In the present technology, the band width WB of the band member is preferably from 20 to 70 mm.

In the present technology, a band thickness H (mm) in the band bonding section and a thickness h (mm) of the band member preferably satisfy a relationship in the following formula (b).

$$0.4h \le H \le 0.9h \tag{b}$$

In the present technology, a length WY (mm) of the band bonding section in a band width direction and a bonding length L (mm) of the band bonding section preferably satisfy a relationship in the following formula (c).

$$3.5(\text{mm}^2) \le WY \cdot L \le 8.0(\text{mm}^2) \tag{c}$$

In the present technology, the length WY (mm) of the band bonding section in the band width direction and the bonding length L (mm) of the band bonding section in a band circumferential direction preferably satisfy a relationship in the following formula (d).

$$0.03 \le WY/L \le 1.0 \tag{d}$$

In the present technology, the length WY (mm) of the band bonding section in the band width direction and the bonding length L (mm) of the band bonding section in the band circumferential direction preferably satisfy a relationship in the following formula (e).

$$0.03 \le WY/L \le 0.5 \tag{e}$$

In the present technology, the band bonding section is preferably provided in at least two locations relative to one noise absorbing member.

In the present technology, a center of a band bonding section is preferably positioned on a neutral line of the band member.

In the present technology, a center position of the band bonding section in the circumferential direction is preferably from 30 to 80 mm from an end portion of the noise absorbing member.

In the present technology, bonding of the noise absorbing member with the band member and the bonding member is preferably carried out by ultrasonic welding.

In the present technology, the band member and the bonding member are preferably formed of the same synthetic resin material.

The tire noise reduction device of the present technology having the preferable configurations described above makes it possible to realize the tire noise reduction device of the present technology which more clearly exhibits the effects of the present technology described above.

In addition, a pneumatic tire using the tire noise reduction device according to the present technology includes the tire noise reduction device described above preferably arranged in a tire cavity space using the band member. As a result, the pneumatic tire is provided in which the tire noise reduction device of the present technology described above is mounted. Such a pneumatic tire can prevent plastic deformation of the band member due to heat in the tire, has good durability, sufficiently exhibits a noise reduction function, even when traveling with a tire for high-speed travel at high speeds such as 270 km/h or greater and 300 km/h or greater.

At this time, an inner diameter (radius) R of the tire and an annular shape outer diameter (radius) r of the band member formed in an annular shape preferably satisfy a relationship in the following formula (f). As a result, it is possible to realize a pneumatic tire that more clearly exhibits the effects of the pneumatic tire of the present technology described above, and has superior durability.

$$0.9 \leq r/R \leq 0.99 \tag{f}$$

BRIEF DESCRIPTION OF DRAWINGS

FIG. 5A to FIG. 5C are model diagrams illustrating the relationship between each embodiment of the band member which can be used in the present technology.

FIG. 8A and FIG. 8B schematically illustrate a state in the vicinity of a bonding section of the noise absorbing member and the band member in the tire noise reduction device according to the present technology.

DETAILED DESCRIPTION

More detailed description will be given below of the tire noise reduction device and pneumatic tire of the present technology with reference to the drawings and the like.

As illustrated in the model diagrams such as FIG. 1, FIGS. 2A and 2B, FIGS. 5A to 5C, FIGS. 7A to 7C, FIGS. 8A and 8B, and the like, the tire noise reduction device 1 of the present technology has a noise absorbing member 2 formed of a porous material; a band member 3 formed of a thermoplastic resin, the band member 3 being formed in an annular shape in a tire circumferential direction for mounting the noise absorbing member 2 on a tire inner surface; a bonding member 5 bent into a concave cross-sectional shape; and a band bonding section 4 at a key point where the noise absorbing member 2, the band member 3, and the bonding member 5 are bonded by interposing the noise absorbing member 2 between the bonding member 5 and the band member 3. A band width WB (mm) of the band member 3 and a length WY (mm) of the band bonding section 4 in a band width direction satisfy the following formula (a) and a yield strength of the band section at the band bonding position in an 80° C. environment is 320 N or greater.

$$0.01 < WY/WB < 0.75 \tag{a}$$

In the tire noise reduction device 1 of the present technology, the band width WB (mm) of the band member 3 and the length WY (mm) of the band bonding section 4 in the band width direction satisfy the above formula (a) and the yield strength of the band section at the band bonding position is 320 N or greater. As a result, the tire noise reduction device 1 can withstand high tension, prevent plastic deformation of the band member 3 caused by large amounts of tension and heat from the tire, has excellent durability, and sufficiently exhibit the noise reduction function, even when traveling with a tire for high-speed travel at high speeds such as 270 km/h or greater and 300 km/h or greater.

In particular, the technical concept of the present technology is that it is possible to improve the high-speed durability of the tire noise reduction device 1 by reducing the length WY (mm) of the band bonding section 4 in the band width direction, maintaining a specified dimension in the band width direction, and suppressing a decrease in the strength of the band member 3. However, in a case where the length WY (mm) of the band bonding section 4 in the band width direction is smaller as the value of WY/WB is 0.01 or less, care is needed since the bonding width is excessively small and the noise absorbing member 2 may fall off from the band member 3. In addition, when the value of the WY/WB is 0.75 or greater, there are difficulties in terms of the processing precision, that is, difficulties in bonding uniformly in the width direction, which is not preferable.

When the yield strength of the band section at the band bonding position is 320 N or greater, it is possible to exhibit high-speed durability without problems at high temperatures. A preferable value for the yield strength of the band section is 500 N or greater. The upper limit of the yield strength is not particularly limited and is preferably set to 2000 N or less.

Figure 1:
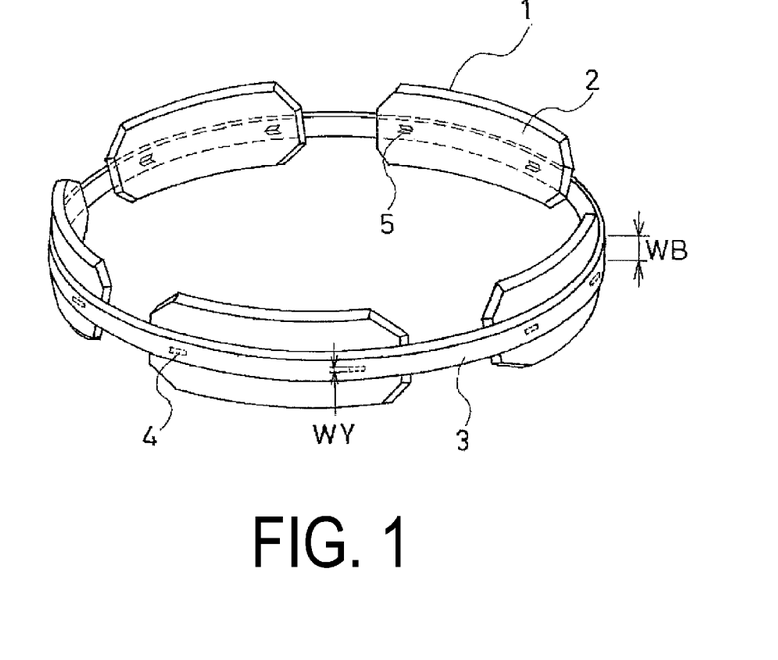
FIG. 1 is an external perspective view schematically illustrating an embodiment of a tire noise reduction device according to the present technology.
Figure 2A:
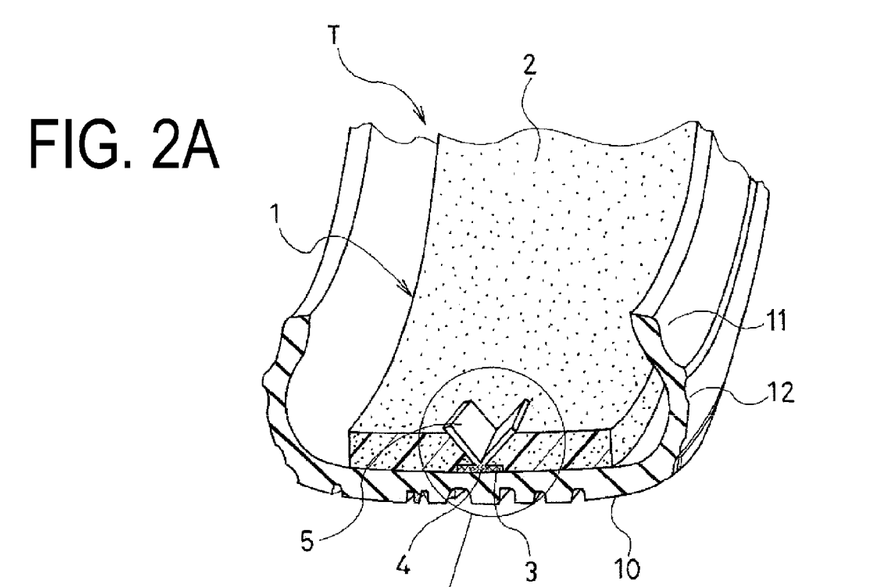
FIG. 2A is a cut away perspective view of main parts illustrating a cut away part of an embodiment of a pneumatic tire according to the present technology in which the tire noise reduction device according to the present technology is mounted inside a tire cavity and FIG. 2B is an enlarged view illustrating enlarged main parts thereof.
Figure 2B:
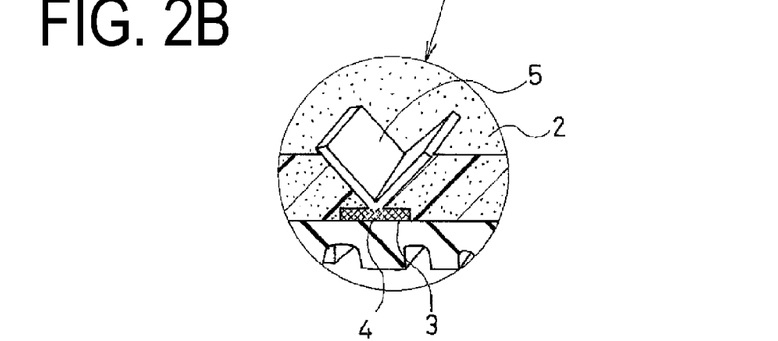
Figure 3A:
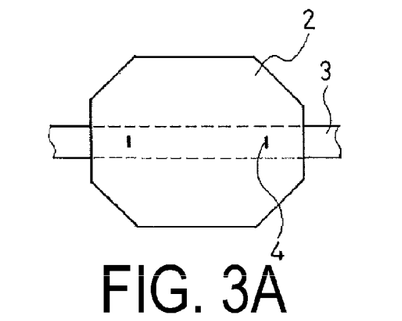
FIG. 3A to FIG. 3G schematically illustrate various examples of a state of a bonding section of a band member and a noise absorbing member which can be used in the tire noise reduction device according to the present technology.
Figure 3B:
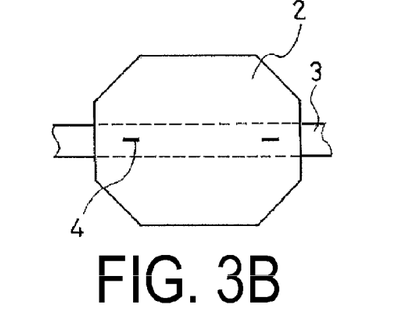
Figure 3C:
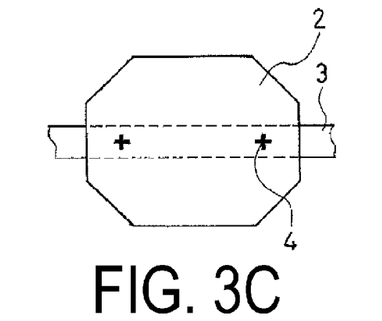
Figure 3D:
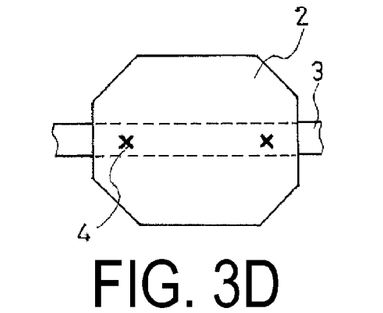
Figure 3E:
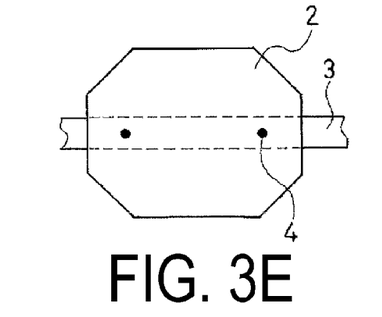
Figure 3F:
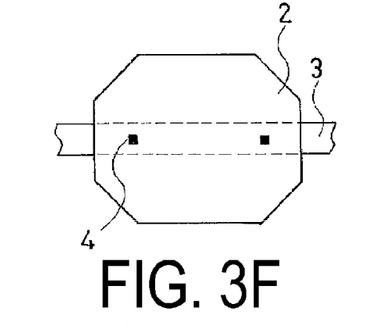
Figure 3G:
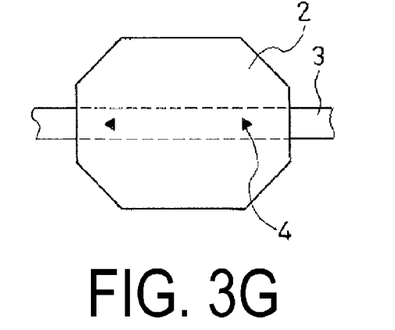
Figure 4A:
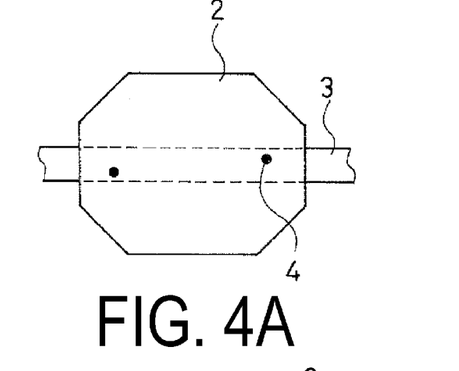
FIG. 4A to FIG. 4E schematically illustrate various other examples of a state of a bonding section of a band member and a noise absorbing member which can be used in the tire noise reduction device according to the present technology.
Figure 4B:
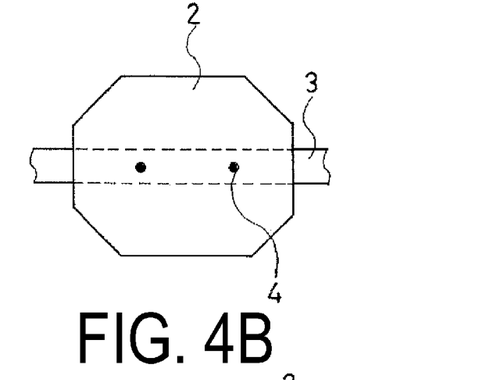
Figure 4C:
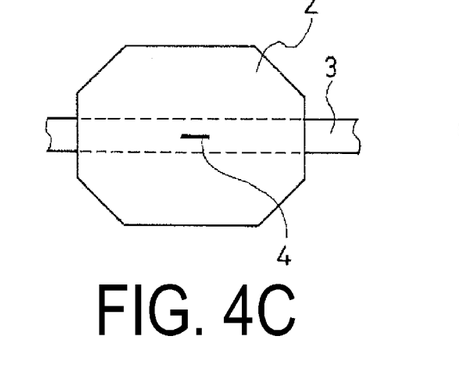
Figure 4D:
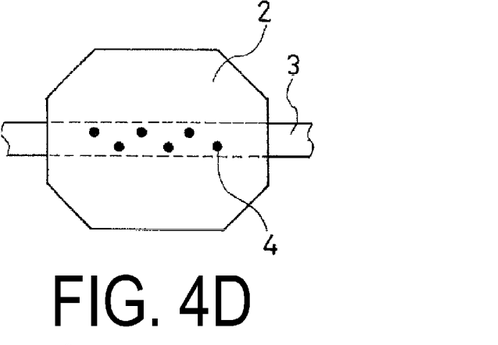
Figure 4E:
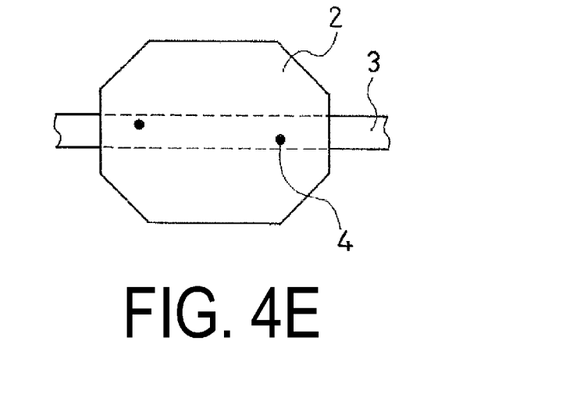

In the present technology, the bent bonding member 5 as illustrated in FIGS. 2A and 2B where the cross section has a recessed surface such as a "V shape" or a "U shape" is a representative example of the "bonding member 5 bent into a concave cross-sectional shape". In a case where the bent bonding member 5 where the cross section has a recessed surface such as a "V shape" is used, the band bonding section 4 has a comparatively short linear shape as illustrated in FIG. 3A and FIG. 3B. However, FIG. 3A illustrates a case of using the bonding member 5 where the linear shape thereof is a "V shape" in a direction orthogonal to the band length direction and FIG. 3B illustrates a case of using the bonding member 5 where the linear shape thereof is a "V shape" in a direction parallel with the band length direction. FIG. 3B corresponds to the model illustrated in FIG. 1 and FIGS. 2A and 2B.

The bonding can be performed by appropriately selecting the form of the band bonding section 4 as a "+" shape, an "×" shape, a "round" shape, a "square" shape, a "triangular" shape, or the like in plan view as illustrated in the models of FIG. 3A to FIG. 3G. In a case of using an ultrasonic welding machine, the above forms of band bonding section are appropriately selected such that the shape of a vibration horn 6 matches the desired type, and the bonding can be performed using a method in which a cutting line, a folding line, or the like, which is engraved to match the desired type, is provided on the bonding member 5 with a flat plate shape before processing, the dimensions, shape, and the like of the bonding member 5 are selected at the same time, and then the ultrasonic welding machine is used, or the like.

FIG. 4A to FIG. 4E schematically illustrate other examples of the bonding state (form) of the band member 3 and the noise absorbing member 2 which can be used in the tire noise reduction device 1 according to the present technology. The examples illustrated in FIG. 4A to FIG. 4E have characteristics in the arrangement of the band bonding sections 4, not in each shape of the band bonding sections 4.

Accordingly, in the tire noise reduction device 1 according to the present technology, the bonding section can be optimized by the combination of types of individual shapes and arrangement positions thereof.

In the present technology, the band width WB of the band member 3 is preferably from 20 to 70 mm. This is because, when the band width WB is 20 mm or greater, the bonding area is reduced as the band width is increased, and the high-speed durability can be improved. However, since increasing the band width WB increases the damage to the tire caused by having the band member 3 in the inner portion, the upper limit of the band width WB is preferably up to 70 mm, that is, the band width WB is preferably 70 mm or less.

Figure 5A:
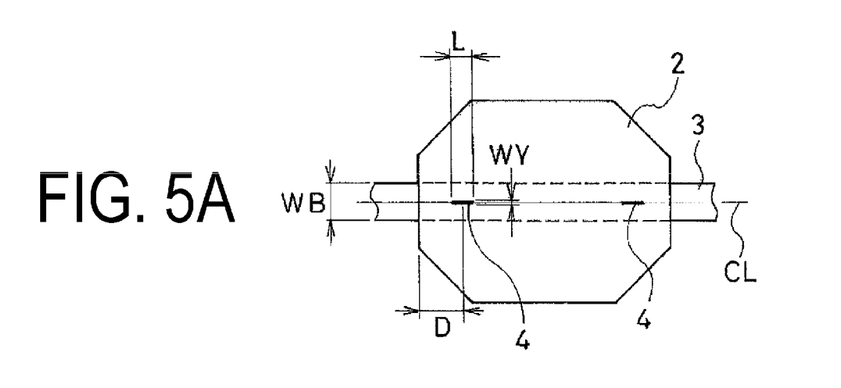
FIG. 5A to FIG. 5C are diagrams illustrating forms of the band bonding sections at which the band member and the noise absorbing member which can be used in the tire noise reduction device according to the present technology are bonded.
Figure 5B:
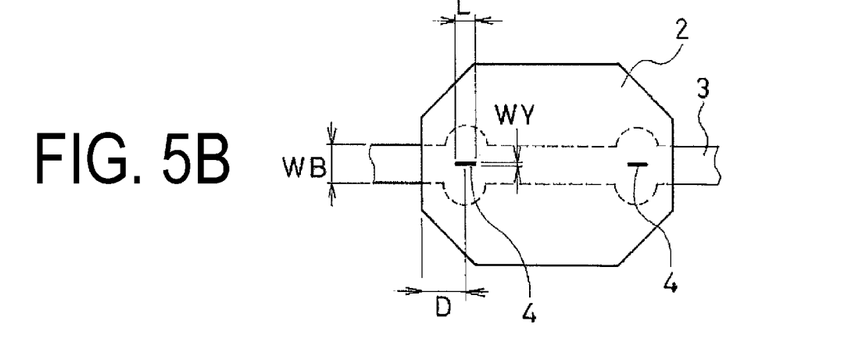
Figure 5C:
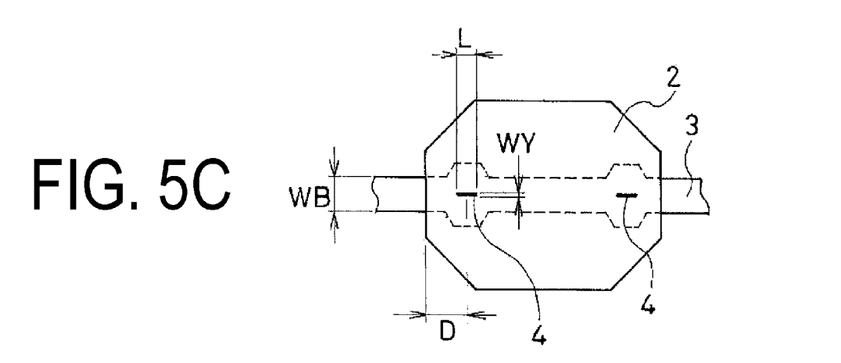

Here, the band width WB refers to the band width in the smallest width portion of the band member 3. FIG. 5A illustrates the band member 3 which is uniform without changes in the width, while FIG. 5B and FIG. 5C illustrate forms where the band width WB is locally increased at positions of the band bonding section 4 in the lengthwise direction thereof. FIG. 5B is a diagram where the band member 3 is enlarged in a semi-circular shape at both sides in plan view and FIG. 5C illustrates the band member 3 being enlarged in a trapezoidal shape in the same manner. In this form, the band width WB refers to the band width at the smallest width portion of the band member 3.

In addition, in the present technology, the band thickness H (mm) of the band member 3 in the band bonding section 4 and the thickness h (mm) of the band member 3 preferably satisfy the relationship in the following formula (b).

$$0.4h \leq H \leq 0.9h \tag{b}$$

Here, the band thickness H (mm) in the band bonding section 4 and the thickness h (mm) of the band member 3 satisfying the relationship in the above formula (b) has the meaning of bonding where the band member 3 is subjected to bonding pressure from the bonding member 5 and is subjected to more compressive force as the intrinsic band thickness is reduced. The relationship is preferably $0.7h \leq H \leq 0.9h$.

According to the findings of the present inventors, a higher and more preferable bonding force can be obtained when bonding is carried out under this level of pressure, which is preferable and, in the tire noise reduction device 1 preferably manufactured according to the present technology, the band member 3 is compressed by the compressive force at the band bonding section 4 to have a form satisfying the above formula (b).

Figure 8A:
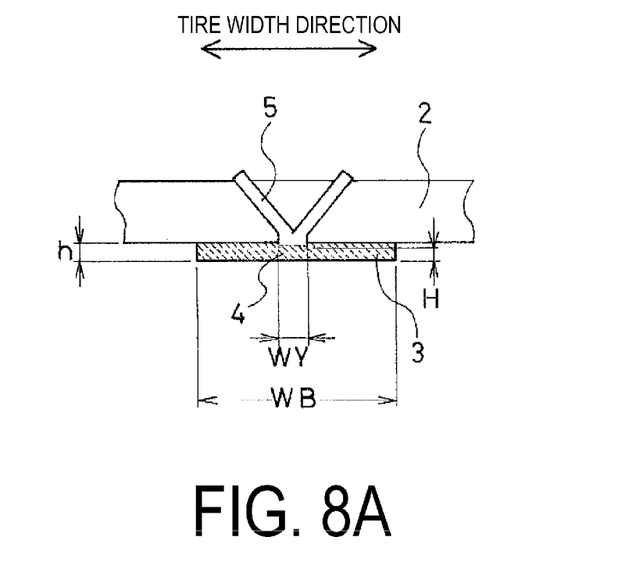
FIG. 8A is a tire width direction cross-sectional view and FIG. 8B is a tire circumferential direction cross-sectional view.
Figure 8B:
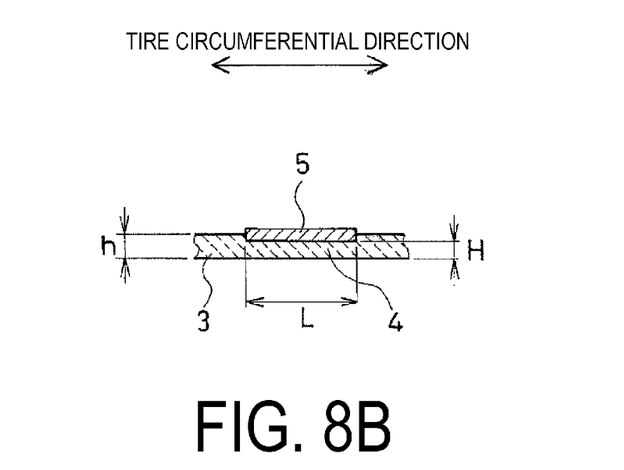

The dimensional relationships among the band member 3, the band bonding section 4, and the bonding member 5 in the present technology are illustrated together in FIG. 8A and FIG. 8B.

FIG. 5A to FIG. 5C illustrate the length WY (mm) of the band bonding section 4 in the band width direction and the bonding length L (mm) of the band bonding section 4 in the band circumferential direction; however, these preferably satisfy the relationship in the following formula (c).

$$3.5(mm^2) \leq WY \cdot L \leq 8.0(mm^2) \tag{c}$$

When the WY·L value is less than 3.5 mm², it is difficult to set the bonding strength of the noise absorbing member 2, the band member 3, and the bonding member 5 to be sufficiently high and it is difficult to realize a high overall durability. In addition, the productivity is lowered in a case where the WY·L value is greater than 8.0 mm², but the obtained effects do not increase at the same rate, which is not desirable.

In addition, the length WY (mm) of the band bonding section 4 in the band width direction and the bonding length L (mm) of the band bonding section 4 in the band circumferential direction preferably satisfy the relationship in the following formula (d).

$$0.03 \leq WY/L \leq 1.0 \tag{d}$$

This is because, by satisfying the relationship in this formula (d), the stress concentration on the band bonding section 4 is alleviated, which is more advantageous in terms of the high-speed durability.

A more preferable range of the WY/L value satisfies the following formula (e) and the high-speed durability is further improved by satisfying formula (e).

$$0.03 \leq WY/L \leq 0.5 \tag{e}$$

However, the WY/L value may be greater than 1.0. For example, the present technology can be configured by setting WY/L=approximately 30 as the upper limit.

Figure 7A:
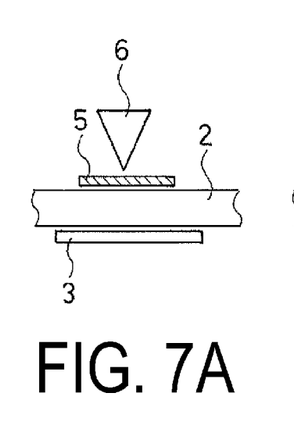
FIG. 7A to FIG. 7C are model diagrams illustrating an example process of a method for producing the tire noise reduction device according to the present technology and illustrate states where the bonding of the noise absorbing member with the band member and the bonding member is carried out by ultrasonic welding using the bonding member.
Figure 7B:
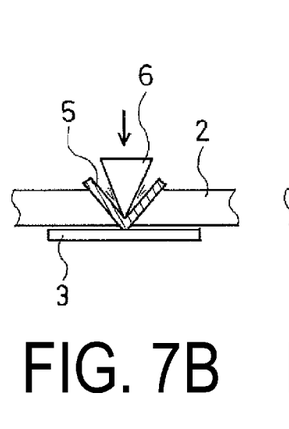
Figure 7C:
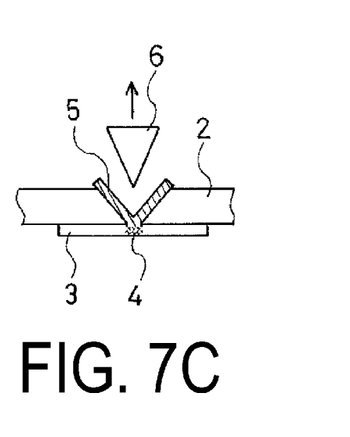

FIG. 7A to FIG. 7C illustrate an example of a method for thermal bonding the bonding member 5 and the band member 3 in a case of using an ultrasonic welding machine. First, as illustrated in FIG. 7A, the noise absorbing member 2 is arranged between the band member 3 and the plate-shaped bonding member 5 formed of thermoplastic resin. Next, as illustrated in FIG. 7B, the vibration horn 6 of the ultrasonic welding machine is pressed into the bonding member 5 such that the bonding member 5 is bent into a concave cross-sectional shape, specifically, set into a state of being bent into a "V shape", and the bent tip portion thereof is locally heated. As a result, as illustrated in FIG. 7C, the bonding member 5 and the band member 3 are further integrated through the noise absorbing member 2 by the thermal bonding. The band bonding section 4 is formed in the integrated part.

In general, providing the band member 3 across the entire circumference in the tire circumferential direction is preferable in terms of obtaining the effect of holding the noise absorbing member 2 longer and at a higher level.

FIGS. 2A and 2B illustrate the pneumatic tire T according to the present technology. In FIGS. 2A and 2B, the pneumatic tire T is provided with a tread portion 10, a pair of left-right bead portions 11, and sidewall portions 12 that mutually connect the tread portion 10 and the bead portions 11. Additionally, the tire noise reduction device 1 schematically illustrated in FIG. 1 with an annular shape is installed on an inner surface of the tread portion 10.

The band member 3 preferably uses a resin with excellent durability with respect to repeated bending deformation as the material. It is preferable to use, for example, a polypropylene resin (PP resin). The same applies to the bonding member 5 and, for example, it is preferable to use a polypropylene resin (PP resin). If both members are the same type of resin material, the bonding strength can generally be made to be high as a result, which is preferable and the same also applies to cases other than using the polypropylene resin (PP resin).

Since thermal bonding can be used as the bonding fixing means for the noise absorbing member 2 and the band member 3 when both members are thermoplastic synthetic resins, it is important to form the band member 3 of a thermoplastic resin in order to enable thermal bonding, have good formability, and the like. Then, as the benefits of adopting thermal bonding, in particular, there is the point that, by using the plate-like bonding member 5 (bonding plate or bonding chips) formed of thermoplastic resin and, for example, pressing the vibration horn 6 (FIGS. 7A to 7C) of the ultrasonic welding machine to a bonding member 5 from the top of the bonding member 5, it is possible to thermally bond the noise absorbing member 2, the band member 3, and the bonding member 5 while thermally deforming the bonding member 5 and the noise absorbing member 2.

Figure 6:
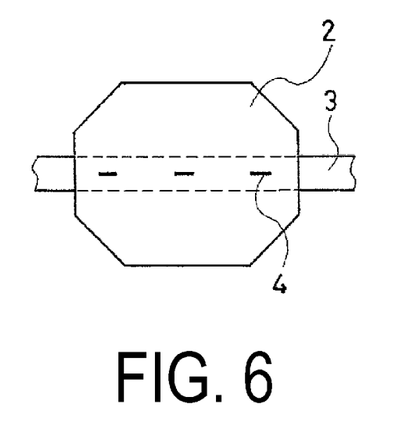
FIG. 6 schematically illustrates another example of a state of a bonding section of a band member and a noise absorbing member which can be used in the tire noise reduction device according to the present technology.

A structural model of the pneumatic tire T is illustrated in FIGS. 2A and 2B, FIG. 2B is an enlarged view of the main parts in FIG. 2A. In FIGS. 2A and 2B, the small bonding member 5 is in a state of being bent into a "V shape" at a key point in the tire circumferential direction and the three parts described above are partially and integrally bonded by thermal bonding. The direction of the broken line of the "shape bent into a V shape" is not particularly limited. However, as illustrated in FIGS. 2A and 2B, FIG. 6, and the like, a direction parallel to the tire circumferential direction is preferable.

The noise absorbing member 2 may be configured by being divided into a plurality of pieces as illustrated in FIG. 1, or may be formed as one continuous member with an overall annular shape.

In addition, providing the band bonding sections 4 in at least two locations with respect to one noise absorbing member 2 is preferable for the durability, cost, and to enable stable processing. In particular, the band bonding sections 4 may be provided at three locations and the durability is superior in such a case (FIG. 6).

In addition, the center position of the band bonding section 4 (not illustrated) in the circumferential direction is positioned in a range of 30 to 80 mm at a distance (D in FIGS. 5A to 5C) from the end portion of the noise absorbing member 2 in the circumferential direction, which is preferable in terms of suppressing flapping of the noise absorbing member 2 and being able to suppress damage to the porous material. More preferably, the position is positioned in a range of 40 to 60 mm at a distance from the end portion of the noise absorbing member 2 in the circumferential direction.

In addition, as illustrated in FIG. 5A, the center of the band bonding section 4 is preferably positioned on a neutral line CL of the band member 3. This is because, by positioning the center of the band bonding section 4 on the neutral line CL of the band member 3, the stress concentration in the width direction of the band member 3 is suppressed and it is possible to favorably prevent decreases in the high-speed durability.

Figure 9:
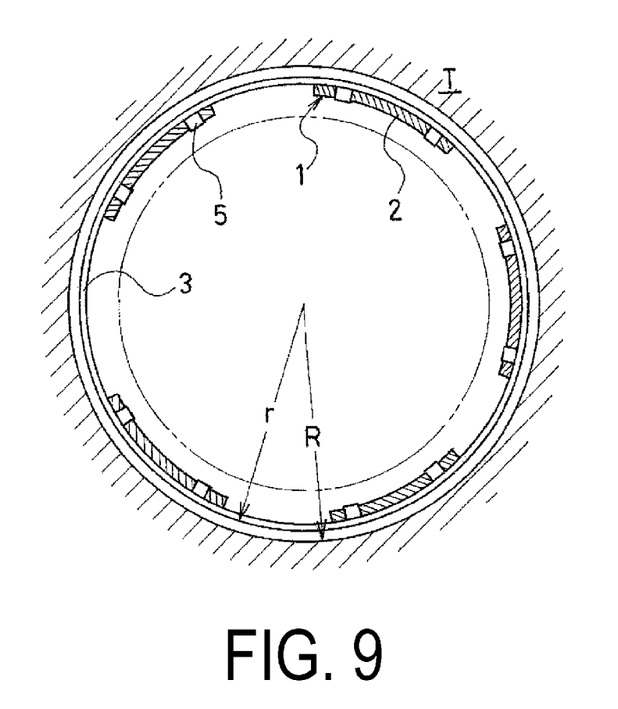
FIG. 9 is a cross-sectional view of main parts in the tire circumferential direction, schematically illustrates a preferable embodiment of a pneumatic tire in which the tire noise reduction device according to the present technology is arranged in a tire cavity space, and illustrates a preferable relationship example between the inner diameter (radius) R of the tire and the annular shape outer diameter (radius) r of the band member formed in an annular shape.

FIG. 9 is a tire circumferential direction cross-sectional view schematically illustrating a preferable embodiment of the pneumatic tire T where the tire noise reduction device 1 according to the present technology is arranged in the tire cavity space and for illustrating a preferable relationship between the inner diameter (radius) R of the tire and the annular shape outer diameter (radius) r of the band member 3 formed in an annular shape.

According to the findings of the present inventors, the inner diameter (radius) R of the tire and the annular shape outer diameter (radius) r of the band member 3 formed in an annular shape preferably have a relationship which satisfies the following formula (f).

$$0.9 \leq r/R \leq 0.99 \tag{f}$$

That is, the annular shape outer diameter (radius) r of the band member 3 is smaller than the inner diameter (radius) R of the tire and the tire noise reduction device 1 according to the present technology intrinsically has a dimensional relationship where, when arranged in the cavity space of the pneumatic tire T, the overall diameter is small and storage is possible without contact with the cavity surface.

The tire noise reduction device 1 having such a dimensional relationship is particularly preferably arranged on the tire cavity surface without bonding with an adhesive or the like. By doing so, the tire noise reduction device 1 is rotated with the movement of the tire and the tire noise reduction device 1 is not peeled or the like along with the tire movement in comparison with a case of being bonded with an adhesive or the like and, as a result, it is possible to realize the pneumatic tire T which is mounted with the tire noise reduction device 1 with good durability.

EXAMPLES

In the present technology, the yield strength of the band section at the band bonding position is determined by the following method.

(1) Yield Strength of Band Section at Band Bonding Position

For the thermoplastic resin forming the band, the yield stress of the thermoplastic resin was determined by performing the tensile test according to JIS (Japanese Industrial Standard) K7161. In the test, a JIS No. 1 dumbbell (thickness 1 mm) was produced, the average yield stress was determined with the sample size as 10 under an atmosphere of 80° C. (dry heat) at a pulling rate of 10 mm/min. On the other hand, the band cross section area A (mm$^2$) with a cross section perpendicular to the band length direction at the band bonding section 4 was determined by observation with a microscope or the like (the average value thereof was determined with the sample size as 10), the value of the yield stress of the thermoplastic resin obtained as described above was multiplied by the obtained cross section area A, and this value was set as the yield strength (N) of the band section at the band bonding position.

In addition, the high-speed durability test was performed with the following method.

(2) High-Speed Durability Test

Starting from a traveling speed of 250 km/h, each test tire travels continuously for 10 minutes at that speed, the presence or absence of band defects was examined and the traveling speed was increased in a unit of 10 km/h in a case where no abnormalities were found and, after continuously traveling at that speed for 10 minutes, the presence or absence of band defects was examined. By repeating the test, the speed at which band defects were generated was set as the band defect speed.

For the presence or absence of the band defects, it was determined that band defects (deformation) occurred when elongation of the circumferential length of the band was found by carrying out the high-speed durability test. For the presence or absence of the band defects, it was determined that band defects (deformation) occurred when elongation of the band was clearly found visually (necking start time) by carrying out the high-speed durability test. In combination therewith, the state of the tire inner surface (the presence or absence of scratches) and the bonding state of the bonding member were observed and evaluated as two states of "no peeling" and "peeling".

Working Examples 1 to 10 and Comparative Examples 1 and 2

Test tires of a tire size 275/35R20 100Y were prepared as test tires and tire noise reduction devices (Working Examples 1 to 10) of the present technology and tire noise reduction devices (Comparative Examples 1 and 2) not of the present technology were mounted in each of the test tire cavities.

All of the noise absorbing members of each test tire were formed of urethane foam (a porous body), and a total of 12 types (Examples 1 to 10 and Comparative Examples 1 and 2) of the tire noise reduction devices were prepared. The band width WB (mm) of the band member and the length WY (mm) of the band bonding section in the band width direction were different in each tire noise reduction device as described in Table 1.

As illustrated in FIG. 1 and FIGS. 2A and 2B, the band members were set as elastic band members formed of thermoplastic resin present in an annular shape on the tire entire periphery and a plurality of noise absorbing members were present across the entire periphery. However, the noise absorbing member were divided into a plurality of parts. The bonding members and the band members were all formed of a thermoplastic resin (polypropylene resin; heat distortion temperature (ASTM D648 heat-resisting temperature (continuous)) is 60° C.). The noise absorbing member and the band member using the bonding member were bonded and integrated using an ultrasonic welding machine.

In each tire noise reduction device, the band width WB (mm) of the band member, the length WY (mm) of the band bonding section in the band width direction, the WY/WB band ratio, the thickness h (mm) of the member, the band thickness H (mm) at the band bonding section, the H/h ratio, the bonding length L (mm) of the band bonding section 4 in the band circumferential direction, the WY·L value, the yield strength (N) of the band section in the band bonding position are as described in Table 1.

The evaluation results for each test tire are shown in Table 1.

TABLE 1

|  | Comparative Example 1 | Working Example 1 | Working Example 2 | Working Example 3 |
|---|---|---|---|---|
| Length of band bonding section in band width direction WY (mm) | 15 | 10 | 5 | 0.5 |
| Band width WB (mm) of band member | 20 | 20 | 20 | 20 |
| WY/WB ratio | 0.75 | 0.50 | 0.25 | 0.03 |
| Band member thickness h (mm) | 1 | 1 | 1 | 1 |
| Bonding section band thickness H (mm) | 0.9 | 0.9 | 0.9 | 0.4 |
| H/h ratio | 0.9 | 0.9 | 0.9 | 0.7 |
| Bonding length L of band bonding section (mm) | 0.5 | 0.75 | 1.5 | 15 |
| WY · L value | 7.50 | 7.50 | 7.50 | 7.50 |
| WY/L value | 30 | 13.3 | 3.3 | 0.03 |
| Yield strength of band section at band bonding position (at 80° C.) (N) | 296 | 320 | 322 | 324 |
| Band defect speed (km/h) | 260 | 270 | 270 | 270 |
| Condition of tire inner surface | No damage | No damage | No damage | No damage |
| Bonding condition of bonding member | No peeling | No peeling | No peeling | No peeling |

|  | Working Example 4 | Working Example 5 | Comparative Example 2 | Working Example 6 |
|---|---|---|---|---|
| Length of band bonding section in band width direction WY (mm) | 0.5 | 0.5 | 0.25 | 15 |
| Band width WB (mm) of band member | 20 | 20 | 20 | 25 |
| WY/WB ratio | 0.03 | 0.03 | 0.01 | 0.60 |
| Band member thickness h (mm) | 1 | 1 | 1 | 1 |

TABLE 1-continued

|  |  |  |  |  |
|---|---|---|---|---|
| Bonding section band thickness H (mm) | 0.7 | 0.9 | 0.9 | 0.9 |
| H/h ratio | 0.8 | 0.9 | 0.9 | 0.9 |
| Bonding length L of band bonding section (mm) | 15 | 15 | 30 | 0.5 |
| WY · L value | 7.50 | 7.50 | 7.50 | 7.50 |
| WY/L value | 0.03 | 0.03 | 0.008 | 30 |
| Yield strength of band section at band bonding position (at 80° C.) (N) | 326 | 328 | 330 | 395 |
| Band defect speed (km/h) | 270 | 270 | 270 | 300 |
| Condition of tire inner surface | No damage | No damage | No damage | No damage |
| Bonding condition of bonding member | No peeling | No peeling | No peeling | No peeling |

|  | Working Example 7 | Working Example 8 | Working Example 9 | Working Example 10 |
|---|---|---|---|---|
| Length of band bonding section in band width direction WY (mm) | 15 | 15 | 15 | 15 |
| Band width WB (mm) of band member | 30 | 40 | 70 | 80 |
| WY/WB ratio | 0.50 | 0.38 | 0.21 | 0.19 |
| Band member thickness h (mm) | 1 | 1 | 1 | 1 |
| Bonding section band thickness H (mm) | 0.9 | 0.9 | 0.9 | 0.9 |
| H/h ratio | 0.9 | 0.9 | 0.9 | 0.9 |
| Bonding length L of band bonding section (mm) | 0.5 | 0.5 | 0.5 | 0.5 |
| WY · L value | 7.50 | 7.50 | 7.50 | 7.50 |
| WY/L value | 30 | 30 | 30 | 30 |
| Yield strength of band section at band bonding position (at 80° C.) (N) | 479 | 647 | 1151 | 1319 |
| Band defect speed (km/h) | 280 | 290 | 340 | 350 |
| Condition of tire inner surface | No damage | No damage | No damage | Small damage but no effect on traveling |
| Bonding condition of bonding member | No peeling | No peeling | No peeling | No peeling |

As can be understood from these results, the tire noise reduction device and the pneumatic tire mounted with the tire noise reduction device according to the present technology are excellent in high-speed durability and can exhibit a tire noise reduction effect with good durability even under conditions of extremely high speeds (for example, 270 km/h or greater, and 300 km/h or greater).

The invention claimed is:

1. A tire noise reduction device comprising:
   a noise absorbing member formed of a porous material;
   a band member formed of a thermoplastic resin, the band member being formed in an annular shape in a tire circumferential direction for mounting the noise absorbing member on a tire inner surface;
   a bonding member bent into a concave cross-sectional shape; and
   a band bonding section at a key point where the noise absorbing member, the band member, and the bonding member are bonded by interposing the noise absorbing member between the bonding member and the band member,
   wherein a band width WB (mm) of the band member and a length WY (mm) of a band bonding section in a band width direction satisfy the following formula (a) and a yield strength of the band section at the band bonding position in an 80° C. environment is 320 N or greater, $$0.01 < WY/WB < 0.75 \tag{a}$$

2. The tire noise reduction device according to claim 1, wherein the band width WB of the band member is from 20 to 70 mm.

3. The tire noise reduction device according to claim 1, wherein a band thickness H (mm) in the band bonding section and a thickness h (mm) of the band member satisfy a relationship in the following formula (b), $$0.4\,h \leq H \leq 0.9h \tag{b}$$

4. The tire noise reduction device according to claim 1, wherein a length WY (mm) of the band bonding section in the band width direction and a bonding length L (mm) of the band bonding section in a band circumferential direction satisfy a relationship in the following formula (c), $$3.5(mm^2) \leq WY \cdot L \leq 8.0(mm^2) \tag{c}$$

5. The tire noise reduction device according to claim 1, wherein the length WY (mm) of the band bonding section in the band width direction and the bonding length L (mm) of the band bonding section in the band circumferential direction satisfy a relationship in the following formula (d), $$0.03 \leq WY/L \leq 1.0 \tag{d}$$

6. The tire noise reduction device according to claim 5, wherein the length WY (mm) of the band bonding section in the band width direction and the bonding length L (mm) of the band bonding section in the band circumferential direction satisfy a relationship in the following formula (e), $$0.03 \leq WY/L \leq 0.5 \tag{e}$$

7. The tire noise reduction device according to claim 1, wherein the band bonding section is provided in at least two locations relative to the noise absorbing member.

8. The tire noise reduction device according to claim 1, wherein a center of the band bonding section is positioned on a neutral line of the band member.

9. The tire noise reduction device according to claim 1, wherein a center position of the band bonding section in a circumferential direction is from 30 to 80 mm from an end portion of the noise absorbing member.

10. The tire noise reduction device according to claim 1, wherein bonding of the noise absorbing member with the band member and the bonding member is carried out by ultrasonic welding.

11. The tire noise reduction device according to claim 1, wherein the band member and the bonding member are formed of the same synthetic resin material.

12. A pneumatic tire, comprising: the tire noise reduction device described in claim 1 arranged in a tire cavity space using the band member.

13. The pneumatic tire according to claim 12, wherein an inner diameter (radius) R of the tire and an annular shape outer diameter (radius) r of the band member formed in the annular shape have a relationship which satisfies the following formula (c), $$0.9 \leq r/R \leq 0.99 \tag{f}$$

\* \* \* \* \*